United States Patent [19]

Husson, Jr. et al.

[11] Patent Number: 4,636,254

[45] Date of Patent: Jan. 13, 1987

[54] SILVER-GLASS PASTE FOR ATTACHMENT OF SILICON DIE TO CERAMIC SUBSTRATE

[75] Inventors: Frank D. Husson, Jr.; Kathleen E. Walter, both of San Diego, Calif.

[73] Assignee: Quantum Materials, Inc., San Diego, Calif.

[21] Appl. No.: 837,543

[22] Filed: Mar. 10, 1986

Related U.S. Application Data

[63] Continuation-in-part of Ser. No. 758,471, Jul. 23, 1985, abandoned.

[51] Int. Cl.[4] .................... C03C 3/10

[52] U.S. Cl. .................... 106/1.14; 106/1.19; 252/514

[58] Field of Search .................... 106/1.14, 1.19; 252/514

[56] References Cited

U.S. PATENT DOCUMENTS

| | | | |
|---|---|---|---|
| 3,497,774 | 2/1970 | Hornberger et al. | 357/51 |
| 4,401,767 | 8/1983 | Dietz et al. | 106/1.13 |
| 4,435,214 | 3/1984 | Ehrreich | 106/1.19 |
| 4,436,785 | 3/1984 | Dietz et al. | 428/433 |
| 4,459,166 | 7/1984 | Dietz et al. | 106/1.13 |

*Primary Examiner*—Lorenzo B. Hayes

*Attorney, Agent, or Firm*—Baker, Maxham & Jester

[57] ABSTRACT

Silver flake and lead borate glass frit are suspended in a liquid organic vehicle of resin and solvent. The silver flakes are present in two different size ranges. The plate is applied between the silicon die and the substrate and is oven fired to provide a bond that accommodates the different coefficients of thermal expansion of the silicon and ceramic substrate. The smaller silver particles improve the sintering of the silver and glass and thereby increase the bond strength while the larger silver particles minimize undersirable shrinkage and cracking of the resultant bond. Silver oxide particles or a special solvent mixture are also used in the paste.

10 Claims, 1 Drawing Figure

10

14

12

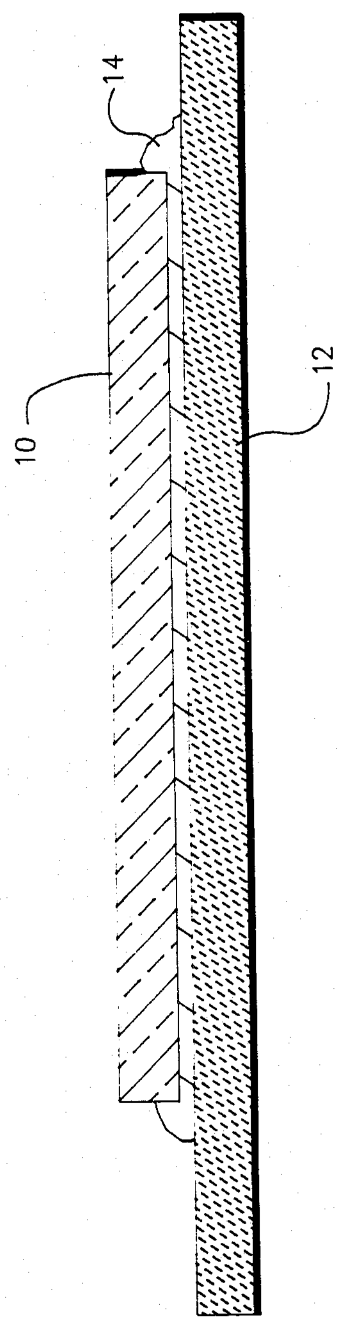
14
10
12

SILVER-GLASS PASTE FOR ATTACHMENT OF SILICON DIE TO CERAMIC SUBSTRATE

CROSS-REFERENCE TO RELATED APPLICATION

This application is a continuation-in-part of our prior identically entitled U.S. patent application Ser. No. 758,471 filed July 23, 1985 and now abandoned.

BACKGROUND OF THE INVENTION

The present invention relates to the art of packaging semiconductor devices, and more particularly, to an improved silver-glass paste which is fired in an oven to securely bond semiconductor die to ceramic substrates.

The manufacture of large scale integrated (LSI) circuits has as its primary goal the lowest possible cost per electronic function performed. The fabrication processes used by the semiconductor industry are adopted with a view toward achieving this goal.

Masks and photolithography are used in building the LSI circuits on a silicon wafer. These circuits are probe-tested and individual dice bearing good circuits are selected from the sectioned wafer and assembled into packages. These packages are mounted and interconnected on printed circuit boards by "chip customers" in the manufacture of computers, communications equipment and defense electronics.

Advances in batch processing wafers simultaneously have led to dramatic reductions in fabrication costs in recent years. However, the costs of testing and packaging the LSI circuits are still very significant because each die must be handled individually. Therefore considerable effort is being applied to advancements in automatic attachment of the silicon die to their substrates. The bond between the silicon die and the ceramic substrate is critical to avoiding circuit failures. The substrate is used as a carrier to support the LSI circuit inside a dual-in-line or other package. Thermal shock, i.e. rapid, substantial changes in temperature may cause the bond to fail if it is unable to accommodate the different coefficients of thermal expansion between the ceramic and the silicon.

Silver-glass attachment pastes have been used in the past for attaching silicon die to ceramic substrates. One prior art silver-glass paste uses silver flakes and lead borate glass frit mixed in a liquid organic vehicle. During an initial drying phase, the liquid vehicle evaporates. Upon firing in an oven, the remaining organic vehicle decomposes and the glass melts down to wet the ceramic substrate, while the silver flake sinters together. Upon cooling the result is a bond between the silicon dice and the ceramic substrate.

The silver-glass die attachment paste is an alternative to gold-silicon eutectics, conductive epoxies and polyimides. The silver-glass paste does not have the special processing requirements of the gold-silicon eutectics, making it more adaptable to automation. The silver-glass paste is inorganic after a low-temperature burn-out, thereby eliminating moisture outgassing problems and thermal degradation associated with organic die attachment methods in hermetic packages. The fired silver-glass bond has a very good modulus of elasticity. Gold-silicon eutectics are not well suited for preventing failures with VSLI chip packages that undergo thermal shock because of their relatively poor modulus of elasticity.

U.S. Pat. No. 4,401,767 of Dietz et al. and U.S. Pat. No. 3,497,744 of Hornberger et al. disclose the use of silver-glass and other cermet materials for bonding silicon die to ceramic substrates. See also U.S. Pat. Nos. 4,459,166 and 4,436,785 of Dietz et al.

SUMMARY OF THE INVENTION

It is therefore the primary object of the present invention to provide an improved silver-glass paste for attaching silicon die to a ceramic substrate.

It is another object of the present invention to provide an improved silver-glass paste of the aforementioned type which has good sintering and avoids shrinkage and undesirable cracking of the bond material when fired.

The subject invention represents an improvement over the prior art silver-glass adhesives. It provides a substantially stronger bond on a more reliable basis. It is particularly suited to attaching large area LSI silicon die to ceramic substrates. The bond strength achieved by the present invention substantially exceeds MIL SPEC requirements for defense applications. Our silver-glass paste does not need aging, its viscosity remains stable, its solids stay in suspension, its rheology is superior and it will not leave an organic residue.

According to our invention, silver flake and lead borate glass frit are suspended in a liquid organic vehicle of resin and solvent. The silver flakes are present in two different size ranges. The paste is applied between the silicon die and the substrate and is oven fired to provide a bond that accommodates the different coefficients of thermal expansion of the silicon and ceramic substrate. The smaller silver particles improve the sintering of the silver and glass and thereby increase the bond strength while the larger silver particles minimize undesirable shrinkage and cracking of the resultant bond. In one embodiment silver oxide provides an additional source of oxygen to help drive off the organic compounds and thereby eliminate residual carbon which would impair the quality of the bond. In another embodiment, a co-solvent system is used to substantially reduce drying time.

BRIEF DESCRIPTION OF THE DRAWING

The drawing is a diagrammatic illustration of a cross-section of a silicon die 10 bonded to a ceramic substrate 12 by a quantity of the silver-glass paste 14 of the present invention. The drawing is not to scale.

DESCRIPTION OF THE PREFERRED EMBODIMENT

Unless otherwise specified, all percentages herein are given by weight.

A first embodiment of our silver-glass paste utilizes two types of Metz Ag flake, type 5SB, and type 15 at a one-to-one ratio. The larger flakes prevent undesirable shrinkage in the fired bond which could leave cracks therein. The smaller flakes are present in much greater numbers than the larger flakes since equal weights of the two flake sizes are used in the first embodiment. The smaller flakes provide numerous sintering points which improve the bond strength of the fired paste. It will be understood that the flake sizes are obtained by milling. Mesh sizes indicate are relative maximum flake size (width), but within a given quantity of silver flake of a specified mesh size, there will be flakes of varying sizes, up to a certain maximum, and normally yielding a mean flake size. Thus the first embodiment of our paste can be said to have a "bi-modal distribution".

In the first embodiment of our paste, a small percentage of Metz monovalent silver oxide is also calculated into the total metal content. The purpose of the silver oxide is to provide a source of oxygen that will ensure that substantially all the organic compounds will be driven off during the firing process. It is undesirable to have carbon in the fired bond because it reduces thermal conductivity, leads to moisture absorption and has other drawbacks. The glass used in Innotech's Lead Borate type 2561 ($PbOB_2O_3$). The vehicle system consists of DuPont's Isobutyl Methacrylate ELVACITE type 2045 solvented in TEXANOL ester alcohol mixture. The silver-glass paste consists of the following percentage components by weight:

TABLE I

| | |
|---|---|
| Metz Ag flake 5SB | 32.69% |
| Metz Ag flake 15 | 32.69% |
| Metz Monovalent AgO | 2.62% |
| Innotech 2561 $PbB_2O_3$ | 17.00% |
| DuPont Isobutyl Methacrylate 2045 | 1.50% |
| TEXANOL | 13.50% |
| | 100.00% |

Set forth hereafter in Table II are the parameters of the metal powder used in our paste:

TABLE II

| | Ag flake 5SB | Ag flake 15 | Monovalent AgO |
|---|---|---|---|
| Apparent density g/in | 32.6-39.2 | 25.6-26.3 | 8.2 |
| Tap density g/cc | 3.5-3.85 | 3.1-3.3 | — |
| Mesh size | −100 | −200 | −16 |
| % wt. loss 110 c/1 hour | N/A | N/A | .04% |
| % wt. loss 177 c/1 hour | .12-.13 | .11-.12 | N/A |
| % wt. loss 538 c/½ hour | .07-.08 | .38-.40 | N/A |
| FISHER PARTICLE SIZE | N/A | N/A | 2.56 micron |
| E-SPEC | | | |
| K | N/A | 2.8 ppm | N/A |
| Na | N/A | 12.1 ppm | N/A |
| Cl | N/A | 40.0 ppm | N/A |

The parameters of the glass used in our paste is: $PbB_2O_3$ = −325 mesh with F.S.B. = 338 C SEM ACSO.

The organic vehicle portion of our first embodiment of our paste was prepared as follows. 10% by wt. isobutyl methacrylate, 2045 is solvenated in TEXANOL using a high sheer mixer. The mixture is brought to 70° C. and held for 10-15 minutes or until resin is completely dissolved. A clear, colorless vehicle system results. The viscosity range is as follows:

Table III

RUT Brookfield viscometer #3 spindle 10, 20, 50 rpm average viscosity = 350-450 cps.

The first embodiment of our Ag/glass product is prepared on a three roll dispersion mill as follows. The vehicle and glass are weighed out into a bowl and hand stirred together. This mixture is placed on loose back rollers and rolled until a homogeneous mixture is obtained. The AgO is added to the glass paste while it is still on the back rollers only, and the material is again rolled until a homogeneous mixture is obtained. The two types of Ag flake are weighed out into a bowl, hand stirred together, and added to the mixture on the mill slowly with loose roller action so as to avoid altering the flake morphology. When all the Ag flake is wet, three to four loose passes through the mill finish up this phase of the preparation process.

The paste is stable, i.e. it requires no period of time after manufacturing for stabilization.

TABLE IV

| Brookfield RVT Viscometer | T-F Spindle | T-C Spindle |
|---|---|---|
| 1 RPM | 320-360 Kcps | 250-260 Kcps |
| 20 RPM | 45-55 Kcps | 36-48 Kcps |
| Slope | 6.5-7.1 | 5.1-6.0 |

The rheology of the first embodiment of our Ag/-glass paste lends itself well to air displacement and syringe applicators. Screen printing is also a possibility. 2-3 mils fired thickness under the die is preferred. A longer drying time significantly increases the adhesion of our Ag/glass material. Optimum drying may be achieved at 70° C. for 12 hours or 60° C. for 24 hours.

The firing parameters for our first embodiment are as follows: 50° C. rise 125° C.−350° C. Peak temperature = 430° C. Time above 400° C. = 5 minutes.

Our first embodiment yields significantly higher adhesion for both large and small die. No aging is necessary with the paste. The viscosity remains stable from the time of manufacturing. No jar rolling is necessary with our material. All solids stay in suspension. The rheology of the paste is superior. Tackiness and lumpiness are avoided to thereby enable better automated or semi-automated applications. Organic/solvent spread is minimized and our material does not leave residue that interferes with subsequent processes.

In a second embodiment of our invention, we use two organic solvents in order to greatly lessen drying time which is otherwise required prior to firing. The paste has a cleaner burnout of the resin at a lower temperature. The co-solvent mixture is sensitive to oxygen so the silver oxide cannot be used. By way of example, with silver-glass pastes that have heretofore been commercially available, four or five hours of pre-furnace drying time was necessary where a large silicon die measuring 400 mils by 400 mils was bonded to a ceramic substrate. Our second embodiment described hereafter can reduce the pre-furnace drying time to one hour or less while still achieving a superior bond. Our second embodiment also uses a silver flake with a bi-modal flake size distribution to improve sintering and avoid shrinkage and cracking.

Broadly, the second embodiment of our silver glass paste consists of 60-75% silver flake having a tap density greater than 2.8 gm/cc and less than 5.0 gm/cc. The silver flake has a bi-modal distribution with a larger size of flakes with a mean width of approximately four times that of a smaller size of flakes also present in the mixture. The ratio of the larger size silver flake to the smaller size silver flake is a maximum of three to one, by weight. Preferrably the paste contains a substantially equal amount, by weight, of the the larger and smaller silver flake powder. Of course this means that there are many more small silver flakes than large silver flakes.

Continuing with a broad description of the second embodiment of our paste, it includes 15-20% lead borate glass frit, 1-2% organic resin, and 8-20% organic solvent of the type that will solvenate, i.e. dissolve, the resin. The solvents may be an alcohol ester and a propylene glycol ether. The resin may be an acrylic and its primary function is to establish the desired thixotropic properties of the liquid vehicle.

Preferably, the resin is 1.5% of the mixture by weight. Preferrably the solvents are TEXANOL alcohol ester mixture and dipropylene glycol monomethyl ether acetate and the co-solvent mixture is 11.5 to 13.5 percent of the paste by weight. The surface area of the glass frit is preferably 0.6 to 1.8 $m^2/gm$. We have found that 33.73% by weight of each of the silver flake sizes produces an excellent paste, where the flake sizes are 200 mesh and 100 mesh, respectively.

Set forth hereafter are formulations according to the second embodiment of our paste which have demonstrated goods results in tests:

TABLE V

| Paste ID | K143 | K146 | | K149 | K151 |
|---|---|---|---|---|---|
| Metz Ag58B | 33.73% | 33.73% | | 33.73% | 32.73% |
| Metz Ag 15 | 33.73% | 33.73% | | 33.73% | 33.73% |
| Innotech 2561 | 17.54% | 17.54% | | 17.54% | 17.54% |
| ELVACITE 2045 | 1.50% | 1.50% | ELVACITE 2044 | 1.50% | 1.50% |
| ARCOSOLVE DPM* | 6.75% | 13.50% | | 6.75% | 13.50% |
| TEXANOL | 6.75% | — | | 6.75% | — |

*(ARCOSOLVE DPM Acetate Dipropyleneglycol Monomethyl Ether)

Having described preferred embodiments of our silver-glass adhesive paste for silicon die attachment, it should be apparent to those skilled in the art that our invention may be modified in both arrangement and detail. Therefore the protection afforded our invention should only be limited in accordance with the scope of the following claim.

We claim:

1. A paste for attaching a silicon die to a ceramic substrate, the paste consisting of:
 32.69% silver flake having an apparent density of 32.6 to 39.2 gm/cubic inch and a tap density of 3.5 to 3.85 gm/cc and a mesh size of approximately 100;
 32.69% silver flake having an apparent density of 25.6 to 26.3 gm/cubic inch, a tap density of 3.1 to 3.3 gm/cc and a mesh size of approximately 200;
 2.62% monovalent silver oxide particles;
 17% lead borate glass frit;
 1.5% isobutyl methacrylate; and
 13.5% organic solvent.

2. A paste for attaching a silicon die to a ceramic substrate, the paste consisting of:
 approximately 60 to 75% silver flake having a tap density greater than 2.8 gm/cc and less than 5.0 gm/cc, the silver flake having a bi-modal size distribution with a larger flake size and a smaller flake size, the ratio of the larger flake to the smaller flake being approximately three to one or less by weight:
 approximately 15 to 20% lead borate glass frit;
 approximately 1 to 2% organic resin; and
 approximately 8 to 20% of an organic solvent that solvenates the resin.

3. A paste according to claim 2 wherein the silver flake has substantially equal amounts, by weight, of the larger size and smaller size flakes.

4. A paste according to claim 2 wherein the solvent consists of an alcohol ester mixture and propylene glycol ether.

5. A paste according to claim 2 wherein there is 33.73% by weight of the larger size silver flake and 33.73% by weight of the smaller size silver flake.

6. A paste according to claim 2 wherein the resin is acrylic.

7. A paste according to claim 6 wherein the paste consists of approximately 1.5% acrylic resin.

8. A paste according to claim 2 wherein the glass frit has a surface area of approximately 0.6 to 1.8 $m^2/gm$.

9. A paste according to claim 2 wherein the solvent includes an alcohol ester mixture and dipropylene glycol monomethyl ether acetate.

10. A paste for attaching a silicon die to a ceramic substrate, the paste consisting of:
 32.69% silver flake having a tap density of 3.5 to 3.85 gm/cc and a mesh size of approximately 100;
 32.69% silver flake having a tap density of 3.1 to 3.3 gm/cc and a mesh size of approximately 200;
 17.54% lead borate glass frit;
 1.5% acrylic resin;
 13.5% organic solvent including an alcohol ester and propylene glycol ether.

* * * * *